US012065353B2

(12) United States Patent
Payne et al.

(10) Patent No.: US 12,065,353 B2
(45) Date of Patent: Aug. 20, 2024

(54) SIPHON PRIMING DEVICE AND METHOD

(71) Applicants: John Payne, Newton, NJ (US); Kendra Payne, Newton, NJ (US); Patrick Payne, Newton, NJ (US); Courtney Payne, Newton, NJ (US); Patricia Payne, Newton, NJ (US)

(72) Inventors: John Payne, Newton, NJ (US); Kendra Payne, Newton, NJ (US); Patrick Payne, Newton, NJ (US); Courtney Payne, Newton, NJ (US); Patricia Payne, Newton, NJ (US)

( * ) Notice: Subject to any disclaimer, the term of this patent is extended or adjusted under 35 U.S.C. 154(b) by 261 days.

(21) Appl. No.: 17/561,889

(22) Filed: Dec. 24, 2021

(65) Prior Publication Data

US 2022/0204334 A1 Jun. 30, 2022

Related U.S. Application Data

(60) Provisional application No. 63/130,480, filed on Dec. 24, 2020.

(51) Int. Cl.
*B67D 3/00* (2006.01)
*F04F 10/00* (2006.01)

(52) U.S. Cl.
CPC ............ *B67D 3/0048* (2013.01); *F04F 10/00* (2013.01)

(58) Field of Classification Search
CPC .................................................... B67D 3/0048
See application file for complete search history.

(56) References Cited

U.S. PATENT DOCUMENTS

| | | | | |
|---|---|---|---|---|
| 1,543,280 A * | 6/1925 | Darragh | F04F 10/00 | 137/152 |
| 5,617,891 A * | 4/1997 | True | B67D 7/007 | 137/212 |
| 6,883,535 B1 * | 4/2005 | Cromwell | F04F 10/00 | 137/148 |
| 2006/0144439 A1 * | 7/2006 | Bell | F04F 10/00 | 137/147 |

* cited by examiner

*Primary Examiner* — Jason K Niesz

(57) ABSTRACT

A siphon priming device that may be releasably and sealingly connected with a first fluid container and usable to cause a liquid to be transferred from the first container into a second fluid container. Using the properties of the first container one may gently squeeze the container to initiate the siphon then remove the pressure and the siphon continues. The first container may comprise a liquid fuel can and the second container may comprise a fuel tank of a motorized vehicle, e.g., boat, car, ATV, cart, plane, motorcycle, etc. In use, the siphon priming device enables simple, rapid, and safe transfer of liquid fuel from a fuel can into a motorized vehicle.

20 Claims, 4 Drawing Sheets

SIPHON PRIMING DEVICE AND METHOD

CROSS-REFERENCE TO RELATED APPLICATIONS

This a claims priority to U.S. Provisional Patent Application Ser. No. 63/130,480, filed on Dec. 24, 2020, the entire contents of which are hereby incorporated by reference.

FIELD OF THE INVENTION

The present invention relates to an improved device and method for priming the transfer of a liquid from a first container to a second container.

BACKGROUND OF THE INVENTION

Siphons are known for simplicity and utility. In some applications, siphons are used to move liquids from a first container to a second container where the first container is located at a higher elevation than the second container. Siphons are used in many applications from draining swimming pools to transporting gasoline from a gas can to a car's fuel tank.

For a siphon to work the siphon must be primed. To transfer a liquid from a first container to a second container, that liquid must fill the siphon tube sufficiently to create a vacuum to draw the liquid out of the first container, causing it to be transferred into the second container. People have used many methods to prime a siphon including a very hazardous method by which one draws liquid into the siphon tube using one's mouth. Other methods include hand pumps and lifting pumps.

Many types of siphons have been suggested but all have proven unsatisfactory for moving liquid from an enclosed can, such as a gasoline can. U.S. Pat. No. 4,414,997 is a siphon with an integrated gate valve that requires shaking to prime. When shaking the device to induce the siphon, fluid is splashed around causing environmental and safety concerns. Once primed, the integrated gate valve restricts the flow rate of the liquid between the containers increasing the time required to complete the transfer process.

There is a need for a device and method for priming that may be safely inserted into a container, with a priming method free of environmental and safety concerns.

There is further a need for a device for priming having a gate valve that does not restrict the flow of fluid to be transported.

Such a siphon should be simple to use and easy to manufacture, enabling a rapid and complete transfer of fluid.

SUMMARY OF THE INVENTION

Preferred embodiments of the present invention provide a siphon priming device that may be connected with a first container. The inventive siphon priming device may be releasably and sealingly connected with the first fluid container and usable to cause a liquid to be transferred from the first container into a second container. In an exemplary embodiment of the present invention, the first container comprises a liquid fuel container and the second container comprises a fuel tank of a motorized vehicle, e.g., boat, car, ATV, cart, plane, motorcycle, etc. In use, embodiments of the present enable simple, rapid and safe transfer of liquid fuel from a fuel can into a motorized vehicle.

It is the objective of this invention to provide a device and method for priming that has improved environmental and safety characteristics, transfer efficiency, and ease of use.

It is another objective of this invention to utilize the inherent flexibility of a container to assist with priming the siphon tube.

It is another objective of the invention to provide a siphon priming device useable on a wide variety of standard containers.

It is another objective of the invention to provide a siphon priming device useable to transfer a wide variety of liquids and gasses.

These and other objectives are accomplished by providing a siphon priming device comprising a bung and a unidirectional gate valve. The priming device may be coupled with a liquid transport tube that extends between a first container and a second container. The tube provides a channel through which liquid can be transferred from the first container into the second container. The tube sealingly passes through the bung that can sealingly engage an opening in the first container to provide an airtight seal among the tube, bung, and first container opening. The unidirectional gate valve is coupled with the bung and configured to control the flow of air into and out of the first container. More specifically, the unidirectional gate valve is configured to prevent air from exiting the first container when the pressure inside the first container is increasing or increased beyond ambient pressure external of the container, and to permit air to enter into the first container when the pressure inside the first container is decreased or is not increased beyond ambient pressure external of the container When the inventive priming device is inserted into the first container an airtight seal is formed with an opening of that container. The bung sealingly engages the opening of the container by fitting within the opening, surrounding the opening, or a combination thereof. The chamber of the container may contain an inert fluid such as air, and a combustible liquid. When the outer sidewalls of the first container are compressed, the pressure within the chamber increases beyond ambient pressure external of the container, forcing the combustible liquid to exit through the tube. When the sidewalls of the first container are released the pressure within the chamber drops and air is drawn into the chamber through the unidirectional gate valve allowing the siphon process to continue and further facilitating the transfer of the combustible liquid out of the first container and into the second container.

DESCRIPTION OF THE DIAGRAMS

Embodiments of the present invention will now be described regarding the following figures, wherein.

DESCRIPTION OF EMBODIMENTS OF THE INVENTION

Figure 1:
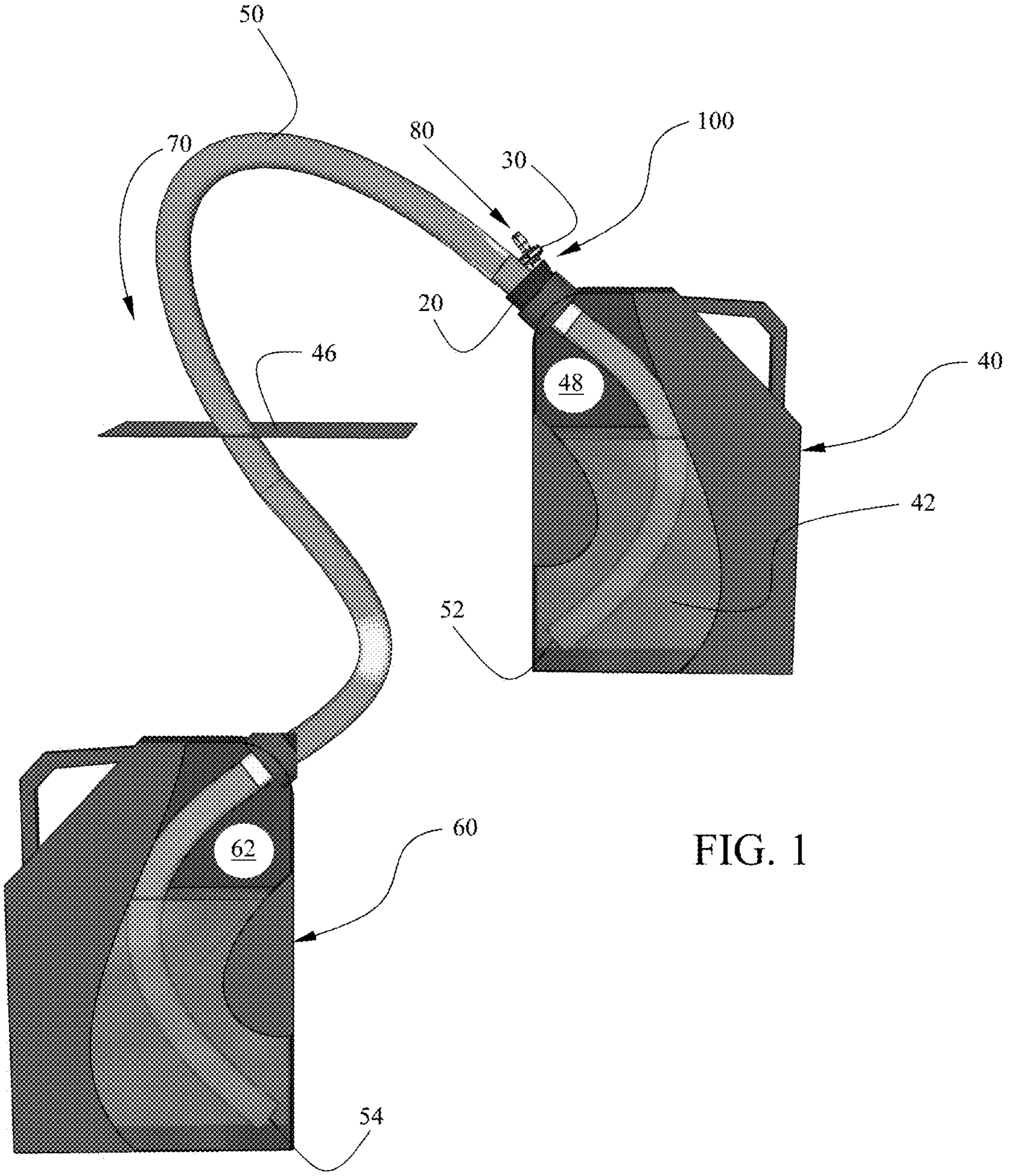
FIG. 1 depicts first and second containers, the first container having an inert and a combustible fluid contained in a chamber thereof, and the siphon priming device of the present invention being coupled in an airtight manner with an opening of the first container.
Figure 2:
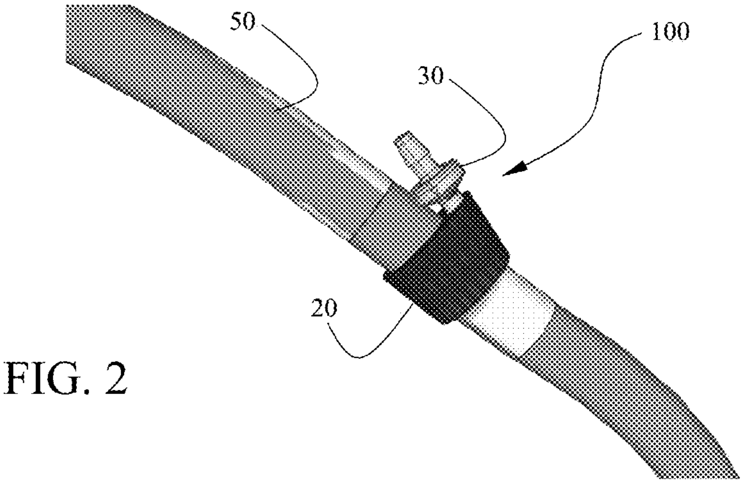
FIG. 2 depicts a detailed view of the siphon priming device in accordance with an embodiment of the present invention.
Figure 3:
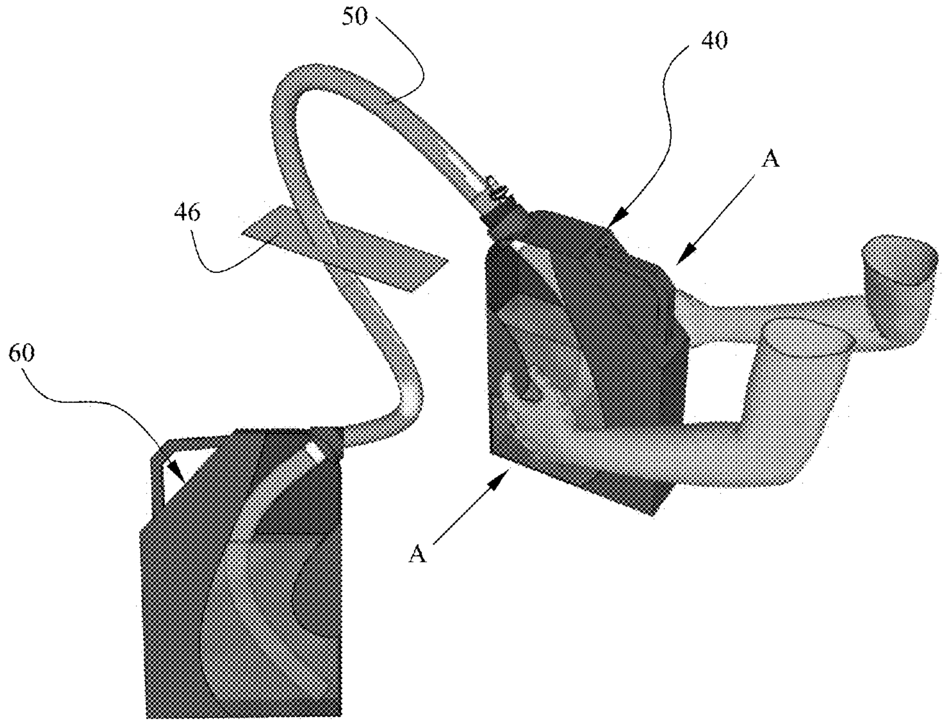
FIG. 3 depicts a use of the siphon priming device of an embodiment of the present invention.

The following describes exemplary embodiments of the present invention. It should be apparent to those skilled in the art that the described embodiments of the present invention are illustrative only and not limiting, having been presented by way of example only. All features disclosed in this description may be replaced by alternative features serving the same or similar purpose, unless expressly stated otherwise. Therefore, numerous and various other embodiments are contemplated by and fall within the scope and spirit of the present invention.

The present invention is directed to a siphon priming device 100 insertable into an opening of a first container 40 and useable for causing fluid 42 held within the container to be transferred into a second container 60. The inventive siphon priming device 100 comprises a seal or bung 20 that is sized and shaped to sealingly engage an opening in the first container 40 and a unidirectional gate valve 30 that is sized and shaped to fit in a first aperture 26 defined through a bore 21 of the bung 20. The bung 20 has a second aperture 22 and a third aperture 24 longitudinally spaced from each other and a longitudinal channel 23 therethrough that is sized and shaped to sealingly receive a hose 50 that provides a first path 70 for fluid communication with an inner chamber 48 of the first container 40, the hose 50 enabling the liquid to pass into out of the chamber 48 of the first container 40. The unidirectional gate valve 30 provides a second path 80 for fluid communication with the chamber 48 of the first container 40. A centerline of the first fluid path 70 and a centerline of part of the second fluid path 80 intersect each other, but the fluid paths 70, 80 do not intersect each other.

Under certain conditions described in more detail herein, the unidirectional gate valve 30 enables a fluid to pass into the chamber 48 of the first container 40, and prevents the fluid from passing out of the chamber 48. In preferred embodiments, the first fluid communication path 70 and second fluid communication path 80 both lead to the chamber 48 but are separate from each other. Preferably, the fluid passing into the chamber 48 through the unidirectional gate valve 30 is air or another inert gas, and the fluid 42 passing out of the chamber 48 through the hose 50 is liquid fuel. It will be obvious to a person skilled in the art from the disclosure provided herein that other fluids may pass into the chamber 48 through the unidirectional gate valve 30, and out of the chamber 48 through the hose 50. The unidirectional gate valve 30 may be provided separate from the bung 20, and the unidirectional gate valve 30 may be assembled or otherwise coupled with the bung 20. Alternatively, the unidirectional gate valve 30 and bung 20 may be integrally and/or unitarily formed using one or more known or hereafter developed manufacturing and assembly process or processes. The bung 20 may also be integrally and/or unitarily formed with the hose 50.

Embodiments of the present invention will be discussed in greater detail with reference to FIGS. 1-5. In a preferred embodiment, the present invention is utilized for transferring liquid fuel 42 from a first container 40 that may be a can for liquid fuel typically used to store and/or transport the fuel 42. However, embodiments of the present invention are not limited to liquid fuel 42, with the present invention being useable to transfer any fluid from a first container to a second container, as described in more detail herein. The fuel 42 may be gasoline, diesel fuel, water, liquid, or vapor of any type—the type of liquid in the container neither limiting nor defining the scope or spirit of the present invention.

Liquid fuel 42 and an inert gas are contained in the chamber 48 of the first container 40. With the siphon priming device 100 coupled with the hose 50, an end of the hose 50 is inserted into an opening of the first container 40, with the hose 50 extending into the fuel 42 contained within the first container 40 to the deepest level possible. The other end of the hose 50 is positioned inside the container 60 to which the liquid from the first container 40 is to be transferred, preferably extending to a level below the fuel level 46 within the container 40. This may extend further into the second container 60 as shown in FIG. 1.

The bung 20 provides an airtight seal between an opening in the first container 40 and the hose 50. The unidirectional gate valve 30 allows air to enter into the first container 40, but prevents air from escaping therefrom during the priming process.

Any auxiliary air vents of the first container 40 must be closed or disabled during the priming phase of the siphoning process.

Figure 4:
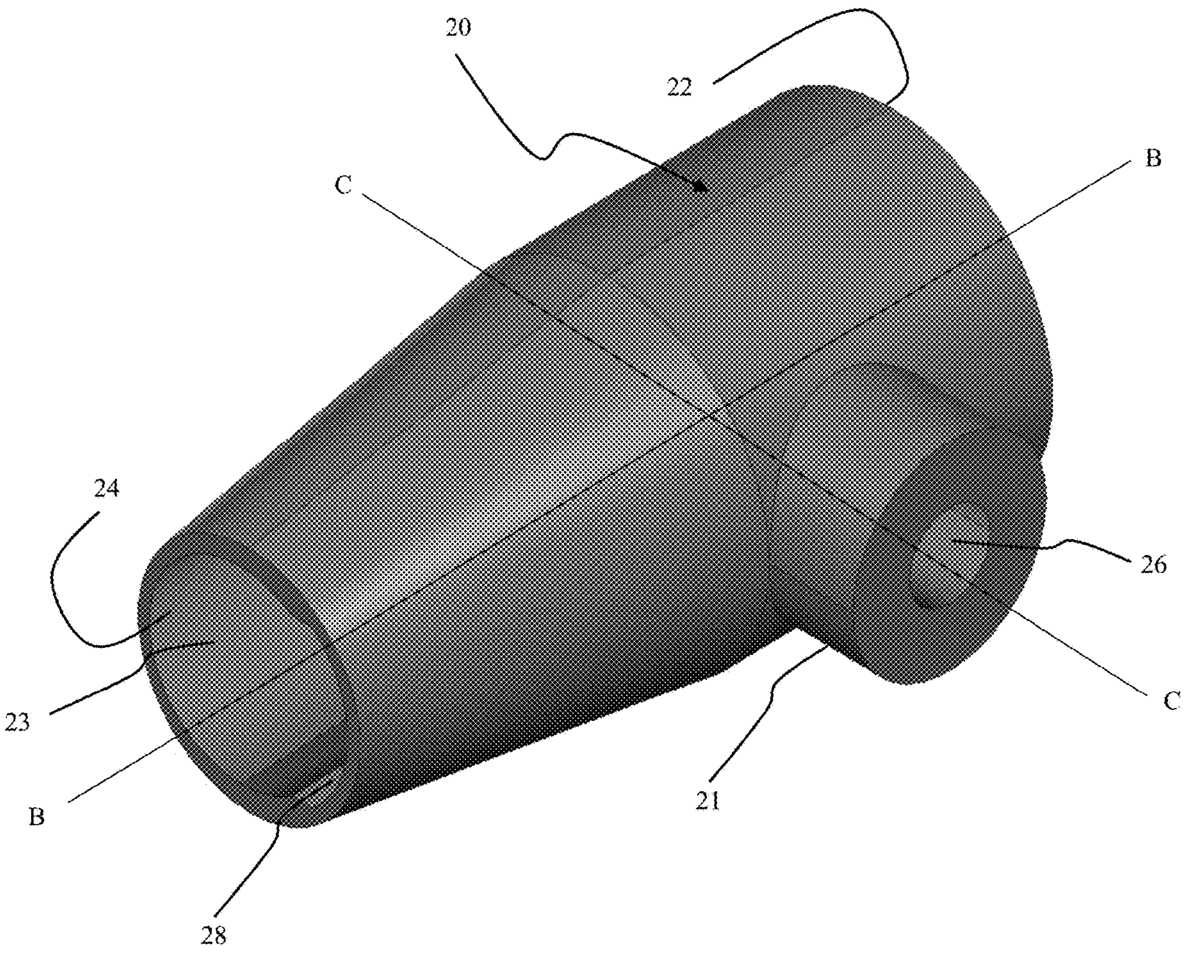
FIG. 4 is a detailed view of a bung in accordance with embodiments of the present invention.
Figure 5:
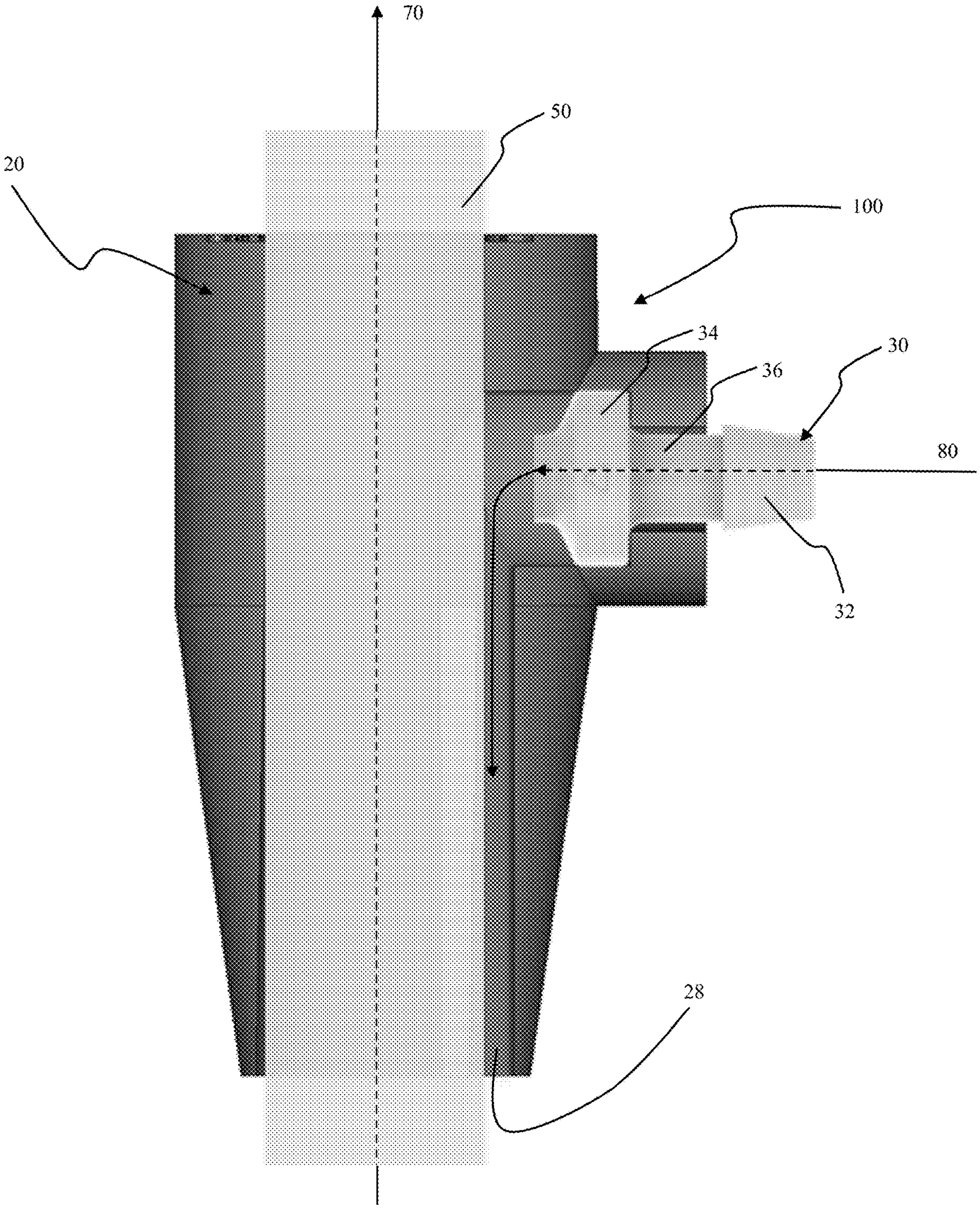
FIG. 5 is a detailed cross-sectional view of the bung of the siphon priming device, with the unidirectional gate valve and a liquid transport tube not depicted in cross-section.

With particular reference to FIGS. 4 and 5, the inventive siphon priming device 100 will now be described in greater detail. The bung 20 has a bore 21 having a first aperture 26 defined therein and a stepped channel 25 defined therethough that are sized and shaped to receive the unidirectional gate valve 30. A centerline C-C defined through the bore 21 and along the stepped channel 25 is oriented generally transverse to a longitudinal centerline B-B defined along the longitudinal channel 23 and through the second and third apertures, 22, 24. It will be obvious to persons skilled in the art and from the disclosure provided herein that non-transverse orientations of the centerline C-C with respect to centerline B-B are contemplated by and with the scope and spirit of the present invention, provided the centerline C-C and centerline B-B are not coaxially oriented or arranged.

The unidirectional gate valve 30 has a head 32 and a base 34 connected by a neck 36 having an outer diameter that is less than an outer diameter of either or both of the head 32 and base 34. The unidirectional gate valve 30 is operable in a first position in which a fluid cannot move along the second fluid path 80, and a second position in which fluid can move along the second fluid path 80. When in the first position the unidirectional gate valve 30 prevents air from exiting the first container 40. When not in the first position the unidirectional gate valve 30 enables air to pass into the first container 40 along the second fluid path 80. Operation of the unidirectional gate valve 30 between the first position and the second position is controlled by the pressure within the chamber 48 of the first container 40. When that pressure is greater than the pressure external of the first container 40, the unidirectional gate valve 30 will be in the first position. When the pressure is less than the pressure external of the first container 40, the unidirectional gate valve 30 will be in the second position.

In an embodiment an audible indicator (not shown) is provided in the second fluid path 80 and indicates when air is moving therealong and that the inventive priming device 100 is operational. It will be obvious to persons skilled in the art and from the disclosure provided herein that other indicators of the operation of the priming device 100 are contemplated by and within the scope and spirit of the present invention.

The first fluid path 70 is defined through the hose 50 and extends between the first and second containers 40, 60. The second fluid path 80 is defined through the gate valve 36 and along channel 28 into the chamber 48. The first fluid path 70 and second fluid path 80 are separate from each other enabling a first fluid to pass along the first fluid path 70 and a second, different fluid to pass along the second fluid path 80. Thus, in accordance with embodiments of the present invention, air can pass along the second fluid path 80 into the first container 40 while liquid fuel can pass along the first fluid path 70, through the hose 50 and out of the first container 40.

In use, a liquid fuel 42 is contained in the first container 40 and is transported from the first container 40 to the second container 60 that is positioned at a level below the first container 40. To initiate the siphon process using the inventive siphon priming device 100, the bung 20 is inserted into or about an opening of the first container 40, providing an airtight seal of that opening. As the hose 50 is carried in an airtight fashion by the bung 20, it too is in airtight engagement with the opening of the first container 40. The hose 50 is preferably positioned in the first container 40 until a first free end 52 of the hose 50 is in the liquid fuel 42, preferably bottoming out or nearly bottoming out within the inner chamber 48 of the first container 40. A second free end 54 of the hose 50 is placed into an inner chamber 62 of the second container 60. Priming is initiated by gently applying pressure to either side or to both sides of the first container 40, as depicted by arrows A in FIG. 3. This gentle pressure will cause the pressure within the inner chamber 48 of the first container 40 to rise above the ambient air pressure surrounding the container. At this point the unidirectional gate valve 30 will be in the first position, closing the second fluid path 80 and preventing air from escaping the first container 40. The increased pressure will cause fuel 42 to exit from the first container 40 through the hose 50 along the first fluid path 70. The pressure is steadily increased until the fuel 42 passing through the hose 50 extends below the fuel level 46 within the first container 40. By locating the second container 60 below the first container 40, this may be observed when the liquid fuel 42 exits the second end 54 of the hose 50. Once fuel extends below this level the operator may gently release pressure from the sides of the first container 40. At this point, the pressure will drop inside the inner chamber 48 of the first container 40, and the unidirectional gate valve 30 will move out of the first position, opening the second fluid path 80 and allowing air to enter into the first container 40 as the fuel flows out of the first container 40 and into the second container 60.

In further use the present invention is directed to a method for priming the transfer of liquid fuel from a first container 40 to a second container 60. A device 100 containing a bung 20 and a unidirectional gate valve 30 in accordance with embodiments of the present invention is provided and coupled in an airtight manner with an opening of a first container 40. A free end 54 of the device 100 is inserted through an opening of a second container 60 into a chamber 62 thereof intended to receive the liquid fuel 42 from the first container 40. The pressure within the chamber 48 of the first container 40 is increased by compressing one or more sidewalls of the first container 40. The unidirectional gate valve 30 prevents a fluid from exiting chamber 48 of the first container 40 while the sidewalls thereof remain compressed. Once liquid fuel 42 begins to transfer out of the first container 40 and into the second container 60, and the external pressure on the sidewalls of the first container 40 is released, air can pass through the unidirectional gate valve 30 and into the chamber 48 of the first container—further facilitating the transfer of the liquid fuel 42 therefrom and into the second container 60.

Modifications to embodiments of the present invention are possible without departing from the scope of the invention as defined by the accompanying claims. Expressions such as "including," "comprising," "incorporating," "consisting of," "have," "is," used to describe and claim the present invention are intended to be construed in a non-exclusive manner, namely allowing for articles, components or elements not explicitly described herein also to be present. Reference to the singular is to be construed to relate to the plural, where applicable.

Although specific example embodiments have been described, it will be evident that various modifications and changes may be made to these embodiments without departing from the broader scope of the inventive subject matter described herein. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This description, therefore, is not to be taken in a limiting sense, and the scope of various embodiments is defined only by the appended claims, along with the full range of equivalents to which such claims are entitled.

What is claimed is:

1. A method for priming the transfer of a liquid from a container having at least one flexible sidewall and containing the liquid and a fluid, the method comprising the steps of:

providing a priming device;

coupling the priming device to an opening of the container; and increasing pressure within the container by compressing the at least one flexible sidewall of the container using only the flexibility of the container as a source of pressure to cause the liquid to exit the container along a first fluid path;

wherein the priming device prevents the fluid from exiting the container when pressure is increasing within the container, and allows the fluid to enter into the container along a second fluid path when pressure is not increasing within the container.

2. The method according to claim 1, wherein the step of providing a priming device further comprises providing a priming device having a unidirectional gate valve to prevent fluid from exiting the container when a pressure within the container is greater than an ambient pressure outside of the container, and to allow fluid to enter into the container when pressure within the container is equal to or less than the ambient pressure outside of the container.

3. The method according to claim 1, wherein the step of providing a priming device further comprises providing a priming device having an indicator of when the priming device is operational.

4. The method according to claim 1, wherein the step of providing a priming device further comprises providing a seal that fits in and/or around an opening of the container.

5. The method according to claim 4, wherein the seal fits in and/or around an opening of the container in an airtight manner.

6. A priming device comprising:
- a container containing a liquid and having at least one flexible sidewall and an opening;
- a seal having longitudinal channel defined therethrough and having a bore defined thereon having a channel defined therethrough, the seal being positionable in and/or about the opening of the container; and
- a unidirectional gate valve sized, shaped and positioned in the channel and configured to permit unidirectional flow of a fluid into the container;
- wherein the unidirectional gate valve prevents the fluid from exiting the container when pressure within the container exceeds an ambient pressure outside of the container, and allows the fluid to enter into the container when pressure within the container is equal to or less than the ambient pressure outside of the container, wherein pressure within the container is increased by compressing the at least one flexible sidewall of the container using only the flexibility of the at least one flexible sidewall as a source of pressure.

7. The device according to claim 6, wherein a centerline of each of the longitudinal channel and channel intersect each other.

8. The device according to claim 6, wherein the longitudinal channel and the channel are not concentrically aligned.

9. The device according to claim 6, further comprising an indicator of when the priming device is operational.

10. The device according to claim 6, wherein the seal is positioned in and/or about the opening of the container in an airtight manner.

11. The device according to claim 6, further comprising a tube sized, shaped and positioned in the longitudinal channel and configured to permit flow of the liquid out of the container along a first fluid path, the unidirectional gate valve being configured to permit unidirectional flow of the fluid into the container along a second fluid path.

12. The device according to claim 11, wherein a centerline of the first fluid path and a centerline of a part of the second fluid path intersect each other, and the first fluid path and the second fluid path do not intersect each other.

13. A priming device comprising:
- a container containing a liquid and having at least one flexible sidewall and an opening;
- a seal positionable in and/or about the opening of the container and having a longitudinal channel defined therethrough and having a bore defined thereon having a stepped channel defined therethrough, a first fluid path for the liquid being defined along the longitudinal channel, and a second fluid path for the fluid being defined along the channel and at least a part of the longitudinal channel, the first and second fluid paths being separate from each other and configured to permit the liquid and the fluid to respectively separately move therealong; and
- a unidirectional gate valve sized, shaped and positioned in the channel and configured to permit unidirectional flow of the fluid into the container, the unidirectional gate valve being in one of a first position and second position;
- wherein the unidirectional gate valve prevents the fluid from exiting the container when pressure within the container exceeds an ambient pressure outside of the container, and allows the fluid to enter into the container when pressure within the container is equal to or less than the ambient pressure outside of the container, wherein pressure within the container is increased by compressing the at least one flexible sidewall of the container using only the flexibility of at least one flexible sidewall as a source of pressure.

14. The device according to claim 13, further comprising a tube sized, shaped and positioned in the longitudinal channel and configured to permit flow of the liquid out of the container.

15. The device according to claim 13, wherein a centerline of each of the longitudinal channel and stepped channel intersect each other.

16. The device according to claim 13, wherein the longitudinal channel and the stepped channel are not concentrically aligned.

17. The device according to claim 13, further comprising an indicator of when the priming device is functioning.

18. The device according to claim 13, wherein the seal is positioned in and/or about the opening of the container in an airtight manner.

19. The device according to claim 13, wherein the seal and unidirectional gate valve are unitarily formed.

20. The device according to claim 13, wherein a centerline of the first fluid path and a centerline of a part of the second fluid path intersect each other, and the first fluid path and the second fluid path do not intersect each other.

* * * * *